(12) United States Patent
Barbano (10) Patent No.: US 6,808,735 B2
(45) Date of Patent: Oct. 26, 2004

(54) FLAVORFUL LOW-FAT CHEESE

(75) Inventor: David Barbano, Dryden, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 252 days.

(21) Appl. No.: 10/205,581

(22) Filed: Jul. 25, 2002

(65) Prior Publication Data

US 2003/0096043 A1 May 22, 2003

Related U.S. Application Data (60) Provisional application No. 60/307,953, filed on Jul. 26, 2001.

(51) Int. Cl.$^7$ ................................................ A23C 19/14
(52) U.S. Cl. ........................ 426/582; 426/417; 426/495; 426/520; 426/518
(58) Field of Search ................................ 426/582, 417, 426/495, 489, 520, 518, 534

(56) References Cited

U.S. PATENT DOCUMENTS

| | | | |
|---|---|---|---|
| RE19,123 E | 3/1934 | Wendt | |
| 2,415,239 A | 2/1947 | Flowers | |
| 2,432,829 A | 12/1947 | Strezynski | |
| 2,466,896 A | 4/1949 | Horneman et al. | |
| 3,562,910 A * | 2/1971 | Runge et al. | 426/466 |
| 5,017,396 A | 5/1991 | Lehmann et al. | 426/491 |
| 5,030,470 A * | 7/1991 | Kielsmeier et al. | 426/582 |
| 5,215,778 A | 6/1993 | Davison et al. | 426/582 |
| 5,277,926 A | 1/1994 | Batz et al. | 426/582 |
| 5,554,398 A | 9/1996 | Chen et al. | 426/36 |
| 5,612,073 A | 3/1997 | Gamay | 426/39 |
| 5,750,177 A | 5/1998 | Yee et al. | 426/582 |
| 5,876,770 A | 3/1999 | Zaikos et al. | 426/89 |
| 5,902,625 A * | 5/1999 | Barz et al. | 426/582 |
| 5,985,349 A * | 11/1999 | West et al. | 426/582 |
| 6,340,490 B1 * | 1/2002 | Owens | 426/518 |
| 6,403,138 B1 * | 6/2002 | Arora | 426/516 |
| 6,426,102 B1 * | 7/2002 | Isom et al. | 426/72 |
| 6,575,725 B1 * | 6/2003 | Keel | 425/306 |
| 6,652,899 B1 * | 11/2003 | Keel | 426/516 |

OTHER PUBLICATIONS

McGee, H. 1984. On Food and Cooking. collier Books, MacMillan Publishing Co., New York, p. 93.*

* cited by examiner

*Primary Examiner*—Carolyn Paden
(74) *Attorney, Agent, or Firm*—Schwegman, Lundberg, Woessner & Kluth, P.A.

(57) ABSTRACT

The invention provides flavorful low-fat cheeses that are readily and inexpensively made from high-fat cheeses.

18 Claims, 4 Drawing Sheets

Figure 1
● Centrifuged for 5 minutes

FIGURE 4

FLAVORFUL LOW-FAT CHEESE

RELATED APPLICATION

This application claims the benefit of priority under 35 U.S.C. 119(e) to U.S. Provisional Patent Application Ser. No. 60/307,953, filed Jul. 26, 2001, which is incorporated herein by reference in its entirety.

FIELD OF THE INVENTION

The invention relates to methods for making low-fat cheese that are simpler than currently available methods and that reliably provide a low-fat cheese that has excellent flavor and texture.

BACKGROUND OF THE INVENTION

Cheddar cheese aging and flavor development is a natural biological and chemical process that occurs spontaneously. However, characterizing the chemistry of Cheddar cheese flavor has been one the most difficult and elusive activities in dairy chemistry. Even today, no single signature compound has been identified and characterized as the key component of aged Cheddar flavor. Lipolysis plays a prominent role in flavor development of Italian hard cheeses. However, in aged Cheddar cheese the contribution of degradation products from fatty acids is thought to play only a minor role. McGugan et al. (1979) concluded that volatile compounds (both fat and water soluble) may play an important role in the subtle aspects of Cheddar flavor quality, while flavor intensity is provided by the water soluble fraction of Cheddar cheese. A variety of chemical compounds (e.g., methanethiol, a variety of other volatile sulfur containing compounds, individual amino acids, small peptides, etc.) have been identified as contributors to aged Cheddar flavor, but no simple formulation exists for reproducibly making flavorful Cheddar cheese.

The current technology used to manufacture low fat Cheddar cheese accomplishes fat reduction by removing fat from the milk prior to cheese making. This method is simple and it accomplishes the goal of reducing the fat content of the cheese. However, there are many limitations to this approach with respect to the quality characteristics of the lower fat Cheddar cheese. When fat content is reduced, Kosikowski and Mistry (1997) have observed that "the environment for starter culture growth is considerably different in low fat cheeses than in full fat cheeses due to changes in composition and, in particular, to the increase in moisture. As a result if starter cultures are not selected with care, the cheese maker may be faced with improper flavor development and evolution of flavor such as bitterness . . . . In addition, moisture control is critical in low fat cheese." Lower fat Cheddar cheeses tend to be excessively hard and sometimes rubbery in texture. Various approaches to manufacturing, such as using a lower cooking temperature, water rinses of the cheese curd after draining the whey, etc. have been used to achieve an acceptable moisture content in low fat Cheddar. The body of low fat Cheddar cheese does not break down during aging as well as it does for full fat Cheddar. Thus, it is very difficult to meet consumer expectations for flavor in an aged lower fat Cheddar cheese.

Current low-fat cheese manufacturing procedures are also cumbersome. For example, when the cheese maker is faced with making one third reduced fat, one half reduced fat, and full fat Cheddar in the same day, three different cheese-making procedures must be used. The milk for each type of cheese must be differently standardized, the cheese maker needs to use a different starter culture for the low fat versus the full fat Cheddar, and the times and temperatures of the manufacturing procedures will be different. Changes in manufacturing procedure within a day increase the chances of errors during cheese making and decrease the efficiency of cheese manufacturing in large modem Cheddar cheese factories. In addition, after the three different types of cheese are packed into 640 pound boxes, the degree of drainage of each type of cheese is different resulting in different final dimensions of the large blocks of cheese. In an automated cut and wrap operation, the variation in size (i.e., height) of 640 pound blocks among Cheddar cheeses with different fat contents causes higher trim loss during cutting, because the cutting systems are designed to handle the exact size of full fat Cheddar. Trim loss during cutting of full fat Cheddar can range from 5 to 10% in 640 pound blocks. When low fat Cheddar is cut from 640 pound blocks, the trim loss can be easily double the amount of that in full fat Cheddar because the dimensions of the block are not matched to the size of cutting equipment. As a result, a considerable amount of research effort is being directed toward the development of methods (including the use of genetically modified cultures) that will produce more typical Cheddar flavors when used in low fat Cheddar cheese production.

When Cheddar cheese is being aged, there is often a need to hold cheese longer because of variation in market demand and seasonal variation in production of the cheese. Thus, it is sometimes desirable to continue to age cheese in inventory until the market demand calls for the product. Continued aging of full fat Cheddar cheese is not a problem because the quality will be excellent over a fairly long period of time. Unfortunately, this is not true for lower fat Cheddar cheeses. A lower fat Cheddar cheese may reach a good flavor in 4 months, but by 8 months it can develop off-flavors. Thus, the window of time during which low fat Cheddar can be used is narrower than that for full fat Cheddar cheese. When inventories of lower fat Cheddar cheese are high, defects can develop and, to avoid severe quality defects, the cheese maker may have to divert some low fat Cheddar cheese to make processed cheese. Thus, producing the correct amount of lower fat Cheddar cheese to meet, but not to exceed, future market demands is problematic.

SUMMARY OF THE INVENTION

The present invention provides a new approach to making low fat cheese that involves removing fat or butter oil from full fat cheese after the cheese is aged. Thus, the present invention involves a method for making a flavorful low-fat cheese that includes shredding a full fat cheese at a low temperature, warming the cheese, removing 1–90% of fat to generate a flavorful low-fat cheese. Additional steps can also be employed, including blending the low-fat cheese to a uniform texture, pressing the low-fat cheese into a block, and cooling. In a preferred embodiment, a low-fat Cheddar cheese is made by the present methods.

Manufacturing of fresh low-fat cheese by the present methods is greatly simplified. Only one cheese making unit, starter culture, and coagulation technique is needed. All cheese is aged for the same time and under the same temperature conditions. No separate aging rooms and temperatures for cheeses of different fat content are needed. Because production of lower fat cheeses is a conversion process, it can be done at the packaging location. The low fat cheese can be made from the trimmed cheese produced during packaging of full fat aged block cheese, or it could be made directly by grinding block cheese. Moreover, the conversion of full fat trim to premium quality lower fat cheese can be a higher value utilization of the trim than would be its use in processed cheese. The amount of lower fat cheese produced can also be adjusted to the short term market demand because, once the cheese is converted to the lower fat level, it is immediately placed in a consumer size package, and can be delivered directly to market with no further aging. The current moisture control problems of lower fat cheeses are solved by the present methods: after a portion of the fat is physically removed from the cheese, water can be added (and possibly other ingredients) to bring the moisture, salt, and pH directly to the desired target level. Thus, the consistency and accuracy in composition control of the lower fat cheeses produced by the present processes would be much better than is currently available using today's technology.

All levels of fat reduced cheese can be produced from the same batch of aged cheese. The processing conditions (e.g., grinding, temperature, fat removal step, water addition step, etc.) can be adjusted to make a range of cheeses with different fat and moisture contents. This ability to quickly adjust the type of cheese produced provides tremendous flexibility and permits the inventory of various types of lower fat cheeses to be controlled as needed.

DETAILED DESCRIPTION OF THE INVENTION

The present invention provides a method for making a flavorful low-fat cheese that includes grinding or shredding a cheese at a low temperature, warming the cheese, and removing 1–90% of fat to generate a flavorful low-fat cheese. In one embodiment, a block of cheese is shredded at 2° C. to 10° C., the shredded cheese is warmed to 22° C. to 42° C., the warm cheese is centrifuged to separate fat from the warm cheese, and the fat is removed to provide a reduced fat cheese. The reduced fat cheese can also be blended to a uniform texture, pressed into a block, and cooled.

Low-fat cheeses made by the present methods retain the taste and texture of the full-fat cheese from which they were made because the majority of the aged cheese flavor intensity resides in the water-soluble fraction of cheese. The intensity of cheese flavor results primarily from the action of enzymes, starter organisms, and nonstarter culture bacteria on intact casein and the degradation products of casein and amino acids. Aston and Creamer (1986) have reported that a sub-fraction of the water-soluble fraction containing most of the salt, free methionine, and free leucine contributed the most to the flavor of the water soluble fraction.

The texture of cheese changes progressively during aging. Most of the texture change in Cheddar cheese is due to the proteolytic breakdown of the casein matrix and possibly to changes in casein-water-calcium interactions as a function of aging. Full fat Cheddar texture starts out rubbery and corky, but rapidly changes to a softer more smooth texture as proteolysis continues during aging. When low fat Cheddar cheese is produced from milk that has been reduced in fat content, the initial texture of the lower fat Cheddar is generally more hard and rubbery than full fat Cheddar.

Development of the soft texture typical of aged full fat Cheddar does not always proceed as desired when making low fat Cheddar cheese by procedures previously available in the art. This may be due to differences in ratio of components within the low fat Cheddar as compared to full fat Cheddar. However, these problems do not arise when using the methods of the invention. Conversion of full fat Cheddar to lower fat Cheddar as provided by this invention is done by using full fat Cheddar that has already developed a normal body and texture as a starting point. The texture of lower fat Cheddar made by the procedures of the invention is more smooth and dissipates even more quickly in the mouth than the full fat Cheddar from which it was made.

Types of Cheese

All types of low-fat cheese can be made by the present methods. For example, low-fat American, Cheddar, Monterey Jack, mozzarella, Muenster, Swiss, and the like can be made by the present methods. In a preferred embodiment, all types of low-fat Cheddar cheese are made by the present methods.

Grinding the Cheese

The cheese can be ground up or shredded using any available method known to one of skill in the art. For example, Waring-style blenders, meat grinders similar to those used to grind hamburger, food processors and the like can be used to grind or shred the cheese. Grinding and shredding can yield somewhat differently sized cheese granules. However, one of skill in the art can readily adapt the grinding or shredding apparatus to yield the appropriately sized cheese granules.

The size of cheese granules produced by shredding or grinding can influence the speed at which fat (butter oil) is released from the cheese. Hence, the cheese is ground to a size sufficient for ready removal of the fat. For example, the cheese is ground or shredded to a size of about 1 mm to about 10 mm in width or diameter. Preferably the cheese is ground or shredded to a size of about 2 mm to about 6 mm in width or diameter, and more preferably the cheese is ground or shredded to a size of about 3 mm to about 5 mm in width or diameter.

The cheese is ground or shredded at a sufficiently low temperature to keep the cheese granules intact and to prevent smearing and melting of the cheese as it is ground or shredded. Such a temperature is about 1° C. to about 15° C., preferably about 2° C. to about 10° C. and more preferably about 3° C. to about 7° C. The most preferred temperature for shredding or grinding the cheese is about 4° C. to about 6° C.

Warming the Cheese

The cheese is warmed for a time and to a temperature that is sufficient to release and to permit separation of the desired amount of fat. A sufficient warming time is the time required to uniformly warm the cheese to the chosen temperature. Such a time varies with the amount of cheese to be warmed and can readily be determined by one of skill in the art.

The temperature employed can vary depending on the amount of fat to be removed and the procedure used to remove the fat. For example, when the fat is removed by centrifugation, a lower temperature may be used than when the fat is simply decanted or skimmed off. One of skill in the art can readily establish the appropriate temperature to soften the cheese and release the desired amount of fat using a chosen method for fat separation. For example, fat can be removed from cheese after warming the cheese to about 20° C. to about 42° C., with more fat removed as the temperature increases. In general, the warming temperature is preferably below about 37° C. and above about 20° C., but this can vary depending upon the size of cheese granule and the procedure used for removing fat. In one experiment, about 55% to 65% of fat was removed when the cheese was warmed to about 32° C. but only about 18% to 23% of fat was removed when the cheese was warmed to about 22° C. The approximate amount of fat removed from a Cheddar cheese varies linearly with the temperature according to the following formula: Fat Removed=4.1 (temperature)−73.9. Further guidance on the selection of an appropriate temperature is provided by the Examples.

Fat Separation

Any method available to one of skill in the art for separating liquid fat or butter oil from a solid or semi-solid material can be used to remove the fat from cheese after it has been warmed to the selected temperature. For example, butter oil can be removed by centrifugation, absorption, draining the cheese and other available procedures. In a preferred embodiment, fat is separated from the warmed cheese by centrifugation. During centrifugation, the cheese will sediment, while the melted fat or butter oil will form a liquid layer on top of the cheese that can readily be decanted. According to the present invention, increasing centrifugation forces will release somewhat more fat or butter oil from the warmed cheese, however, the temperature of the warmed cheese is a more powerful determiner of the amount of fat removed.

One of skill in the art can readily determine the necessary centrifugal force for removing the desired amount of fat or butter oil. In one experiment, the present inventors observed that the amount of fat removed from cheese warmed to about 30° C. increased from about 38% when the centrifugal force was about 2000×g, to about 48% when the centrifugal force was about 23,000×g. However, warming the cheese from about 25° C. to about 30° C. increased the amount of fat removed by over 20%. In general, a centrifugal force of about 1000×g to about 30,000×g is used. Preferably, the centrifugal force is about 5000×g to about 25,000×g.

Similarly, increasing the time of centrifugation will increase the amount of fat removed, but the temperature is still a larger determinant of the amount of fat removed. For example, increasing the time of centrifugation from about 5 minutes to about 20 minutes increased the amount of fat removed by about 10% for cheese warmed to about 25° C. to about 30° C. Accordingly, one of skill in the art can adjust the size of cheese granules, the warming temperature and the fat separation method to produce a low-fat cheese with the desired amount of fat.

The Examples section also provides further guidance on the conditions that can be used for removing fat from cheese.

Additional Steps

Additional steps can also be employed including blending the low-fat cheese to a uniform texture, pressing the low-fat cheese into a block, and cooling.

EXAMPLE 1

Preliminary Experiments on Mozzarella Cheese

Water was removed from Mozzarella cheese during the first two weeks of refrigerated storage by grinding, warming, and centrifuging the cheese to remove water. After about 10 to 12 days, water could no longer be removed from the cheese by centrifugation at 25° C. However, as the Mozzarella cheese got older, an increasing amount of fat could be removed. Aged Cheddar cheese was used to further develop a method for physically removing fat to produce reduced fat aged Cheddar cheeses.

EXAMPLE 2

Preliminary Experiments on Cheddar Cheese

Test batches of lower fat Cheddar cheese containing about 25 to 60% less fat were made by removing butter oil from both commercial and university produced full fat aged Cheddar cheese. In general, about 25% of the fat was removed from aged Cheddar cheese by warming the cheese to about 22° C. and centrifuging it at about 24,000 g for 20 minutes. Twenty minutes of centrifugation is probably longer than what was needed under the shredding and warming conditions used. At a warming temperature of about 30° C., a significant amount of butter oil had already leaked out of the cheese before centrifugation, and about 50% of fat could be removed after centrifugation. At 37° C., a 62% fat reduction was achieved.

Starting with an aged Cheddar cheese of about 34% fat and 36.5% moisture, fat separation at 30° C. resulted in a final composition of 16% fat and 45.6% moisture. When fat is removed, it is normal for the percentage of both moisture and protein to increase. If water is added to the product before it is formed into a block, the moisture content can be increased up to a constant target level (e.g., 50%) to help control consistency of flavor and texture quality.

Table 1 (below) provides the fatty acid composition and weight per 28 gram serving of an original full fat Cheddar cheese and the lower-fat cheese produced from it.

TABLE 1

Fat Content of Cheese

| Fatty Acid | Full Fat (grams) | Full Fat (%) | Lower Fat (grams) | Lower Fat (%) |
| --- | --- | --- | --- | --- |
| C 4 | 0.198 | 2.17 | 0.102 | 2.24 |
| C 6 | 0.166 | 1.80 | 0.085 | 1.87 |
| C 8 | 0.106 | 1.15 | 0.055 | 1.21 |

TABLE 1-continued

Fat Content of Cheese

| Fatty Acid | Full Fat (grams) | Full Fat (%) | Lower Fat (grams) | Lower Fat (%) |
|---|---|---|---|---|
| C 10 | 0.248 | 2.68 | 0.123 | 2.71 |
| C 12 | 0.290 | 3.14 | 0.143 | 3.15 |
| C 14 | 0.997 | 10.79 | 0.518 | 11.41 |
| C 14:1 | 0.232 | 2.51 | 0.110 | 2.42 |
| C 16 | 2.593 | 28.07 | 1.390 | 30.62 |
| C 16:1 | 0.288 | 3.12 | 0.133 | 2.93 |
| C 18 | 1.447 | 15.67 | 0.809 | 17.82 |
| C 18:1 | 2.521 | 27.29 | 1.065 | 23.46 |
| C 18:2 | 0.151 | 1.63 | 0.007 | 0.15 |
| Total | 9.237 g | 100% | 4.540 g | 100% |

As seen in Table 1, the fat content of the cheese was reduced by about 50.8% when using the methods provided herein. The proportion of each fatty acid type varied a little between the full-fat and lower-fat cheese. For example, the relative proportion of C 18:2 decreased in from 1.63% in the full fat cheese to 0.15% in the lower-fat cheese. The amount of C 18:1 decreased from 27.29% in the full-fat cheese to 23.46% in the lower fat cheese.

These data on fatty acid composition indicate that the fatty acid composition of the butter oil removed from the cheese does not differ greatly from that of milk fat. However, the butter oil produced by this method may have a lower melting temperature than the melting temperature of total milk fat. These data suggest that the butter oil produced by this method has utility as a component of products such as butter, oil, sauces, etc.

EXAMPLE 3

Temperature Influences Fat Removal Materials and Methods

Commercial aged Sharp Cheddar cheese was used as a starting material. The cheese was shredded to a diameter of about 4 mm at a temperature of about 4 to 6° C. After shredding, the cheese was warmed to a temperature between 20° C. and 37° C. A Sorval centrifuge with a GSA centrifuge head and a 250 ml capacity screw cap centrifuge tubes were used for separating the butter oil from the bulk of the cheese. The centrifugal force was varied from 800 to 24,000×g for times ranging from 5 to 25 minutes to test for the effect of centrifugal force and duration on butter oil removal. The butter oil was decanted from the centrifuge tubes. The lower layer of reduced fat cheese solids was removed, blended to make it homogeneous, adjusted to various target moisture levels (e.g., 48%, 50%, 52%, etc.) and pressed into small blocks (about 2.5 lbs).

Results

Figure 1:
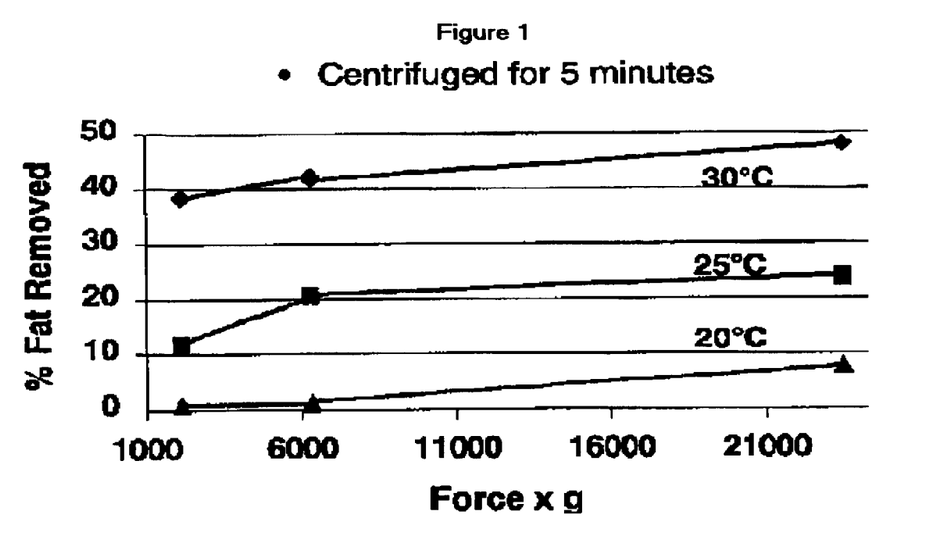
FIG. 1 illustrates the amount of fat removed from full-fat Cheddar cheese at different temperatures as a function of centrifugal force. Centrifugation time was held constant at 5 minutes. Cheese warmed to 30° C. (♦) was compared to cheese warmed to 25° C. (■) and to 20° C. (▲). The amount of fat removed increased somewhat as the centrifugal force used to separate the butter oil from the cheese was increased.

FIG. 1 illustrates the amount of fat removed at different temperatures as a function of centrifugal force. Centrifugation time was held constant at 5 minutes. As shown, when the cheese is warmed to 30° C. (♦) the amount of fat removed varies from about 38% to about 48%, depending upon the centrifugal force used to separate the butter oil from the cheese. When the cheese is warmed to 25° C. (■) the amount of fat removed varies from about 12% to about 24%, depending upon the centrifugal force used to separate the butter oil from the cheese. Finally, when the cheese is warmed to only 20° C. (▲) the amount of fat removed varies from only about 2% to about 8%, depending upon the centrifugal force used to separate the butter oil from the cheese.

Figure 2:
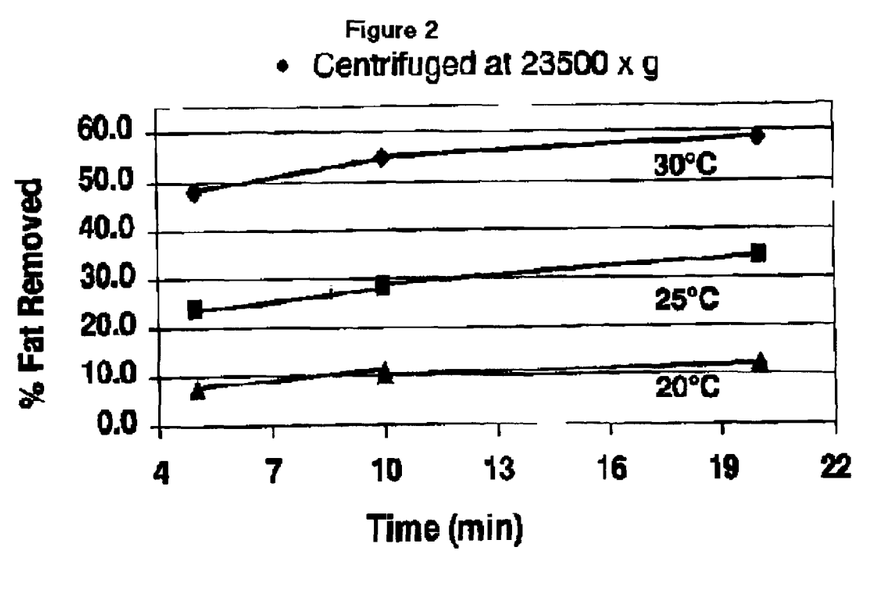
FIG. 2 illustrates the amount of fat removed from full-fat Cheddar cheese at different temperatures as a function of centrifugation time. Centrifugation force was 23,500×g throughout. The percentage fat removal from full-fat Cheddar cheese warmed to 30° C. (♦) was compared to the percentage fat removal from Cheddar cheese warmed to 25° C. (■) and to 20° C. (▲). The amount of fat removed increased somewhat as the time of centrifugation used to separate the butter oil from the cheese was increased.

FIG. 2 illustrates the amount of fat removed at different temperatures as a function of centrifugation time. Centrifugation force was 23,500×g throughout. As shown, when the cheese is warmed to 30° C. (♦) the amount of fat removed varies from about 48% to about 58%, depending upon the time of centrifugation used to separate the butter oil from the cheese. When the cheese is warmed to 25° C. (■) the amount of fat removed varies from about 24% to about 34%, depending upon the time of centrifugation used to separate the butter oil from the cheese. Finally, when the cheese is warmed to only 20° C. (▲) the amount of fat removed varies from about 7% to about 12%, depending upon the time of centrifugation used to separate the butter oil from the cheese.

Figure 3:
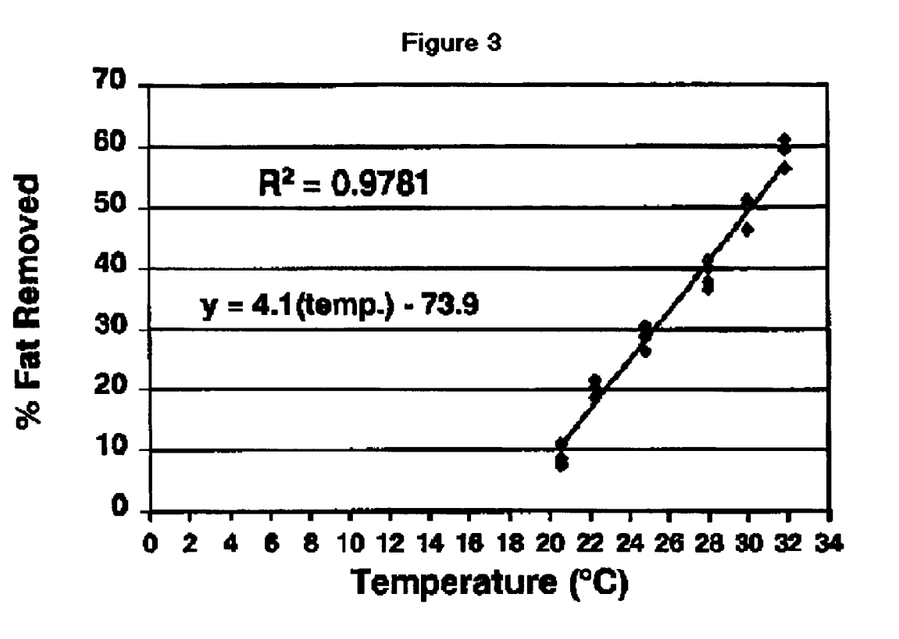
FIG. 3 illustrates the effect of cheese temperature on fat removal. The optimal line plotted for these data is y=4.1 (temperature)−73.9, indicating that the amount of fat removed from a full-fat cheese (y) has a linear relationship with the temperature to which the cheese is warmed. As illustrated, the temperature of cheese has a strong effect on the amount of fat removed during centrifugation.

FIG. 3 shows a graph illustrating the effect of temperature on fat removal.

Table 2 provides a comparison of the composition of a full-fat cheese with the 53% reduced fat cheese produced therefrom.

TABLE 2

Full-Fat and Low-Fat Cheese Composition

| Cheese Type | Fat (%) | Moisture (%) | Protein (%) | Salt (%) | pH |
|---|---|---|---|---|---|
| Full-Fat | 34.0 | 36.6 | 25.0 | 1.74 | 5.15 |
| Low-Fat | 16.0 | 45.6 | 32.0 | 2.21 | 5.13 |

EXAMPLE 4

Low-Fat Cheese Flavor Intensity

Figure 4:
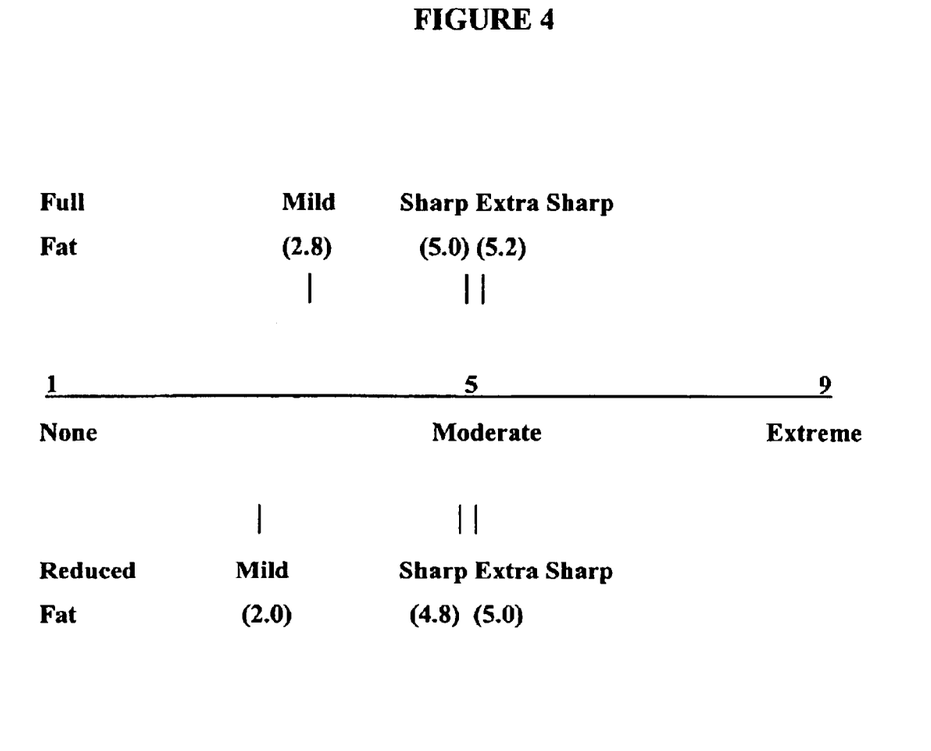
FIG. 4 provides a scale of the flavor intensity reported by nine panelists for full-fat Cheddar cheese versus 50% reduced-fat Cheddar cheese. Panelists were asked to compare the flavor intensity of full fat commercial Cheddar cheese with 50% reduced fat Cheddar cheese made from the full fat cheese according to the present invention. Three varieties of full fat cheese were tested and used for making three varieties of 50% reduced fat cheeses that were also tested: very mild Cheddar cheese, sharp Cheddar cheese and extra sharp Cheddar cheese. As illustrated, panelists were given a 10 cm line on which to rate the flavor intensity of the cheeses that was labeled with "None," "Moderate," and "Extreme" to indicate the degree of flavor intensity for the various cheeses. As illustrated, the three varieties of full fat Cheddar cheese and 50% reduced fat Cheddar cheeses were rated similarly.

Panelists were asked to compare the flavor intensity of full fat commercial Cheddar cheese with 50% reduced fat Cheddar cheese made from the full fat cheese according to the present invention. Three varieties of full fat cheese were tested and used for making three varieties of 50% reduced fat cheeses that were also tested: very mild Cheddar cheese, sharp Cheddar cheese and extra sharp Cheddar cheese. Panelists were given a 10 cm line on which to rate the flavor intensity of the cheeses that was labeled with "None," "Moderate," and "Extreme" to indicate the degree of flavor intensity for the various cheeses. The three varieties of full fat Cheddar cheese and 50% reduced fat Cheddar cheeses were rated as shown in FIG. 4. A statistical analysis of the differences in flavor ratings by the panelists indicates that there is no statistically significant difference in flavor intensity between the full-fat and reduced-fat cheese produced therefrom (Table 3).

TABLE 3

Statistical Analysis of Flavor Intensity Data.

| Source | DF | Sum of Squares | p-value |
|---|---|---|---|
| Model (R2 = 0.6988) | 16 | 168.93 | 0.0215 |
| Cheese Type | 2 | 110.06 | <0.0001 |
| Panelist (random) | 11 | 53.81 | 0.0567 |
| Panelist*Cheese Type | 22 | 49.14 | 0.7213 |
| Fat (Cheese Type) (fixed) | 3 | 5.07 | 0.6241 |
| Error | 55 | 93.99 | |
| Total | 71 | 312.06 | |

REFERENCES

These references are incorporated by reference.
1. Kosikowsik, F. K. and V. V. Mistry, *Low fat and specialty cheeses,* in Cheese and Fermented Milk Foods, Chapter 23 (1997)(F. V. Kosikowski, L.L.C., 1 Peters Lane, Westport, Conn.).

2. McGugan, W. A., D. B. Emmons, and E. Larmond, *Influence of Volatile and Nonvolatile Fractions on Intensity of Cheddar Flavor,* 62 J. Dairy Sci. 398–403 (1979).

3. Rank, T. C., R. Grappin, and N. F. Olson, *Secondary Proteolysis of Cheese During Ripening: A Review,* 68 J. Dairy Sci. 801–805 (1985).

4. Aston, J. W., and L. K. Creamer, *Contribution of the Components of the Water-soluble Fraction to the Flavor of Cheddar Cheese,* 21 New Zealand J. of Dairy Sci. 229–248 (1986).

5. Lawrence, R. C., L. K. Creamer, and J. Gilies, *Texture Development During Cheese Ripening,* 70 J. Dairy Sci.1748–1760 (1987).

What is claimed:

1. A method for making a flavorful low-fat cheese that comprises:
   (a) shredding a cheese at a temperature of about 1° C. to about 15° C. to produce a shredded cheese;
   (b) warming the shredded cheese to temperature of about 20° C. to about 42° C. to produce a warmed cheese; and
   (c) removing about 1% to about 90% of fat from the warmed cheese to generate a flavorful low-fat cheese.

2. The method of claim 1 wherein the shredded cheese comprises cheese granules of about 1 mm to about 10 mm in diameter.

3. The method of claim 1 wherein the shredded cheese comprises cheese granules of about 2 mm to about 6 mm in diameter.

4. The method of claim 1 wherein the shredded cheese is warmed to a temperature of about 20° C. to about 37° C.

5. The method of claim 1 wherein the fat is removed from the warmed cheese by centrifugation.

6. The method of claim 5 wherein the centrifugation provides a centrifugal force of about 1000×g to about 30,000×g.

7. The method of claim 5 wherein the centrifugation provides a centrifugal force of about 5000×g to about 25,000×g.

8. The method of claim 1 wherein the flavorful low-fat cheese is blended and pressed into a block before cooling.

9. The method of claim 1 wherein the low-fat cheese is flavorful in that its flavor is similar to the high fat cheese from which it was derived.

10. A method for making a flavorful low-fat cheese that comprises:
    (a) shredding a cheese at a temperature of about 4° C. to about 6° C. to produce a shredded cheese;
    (b) warming the cheese to temperature of about 20° C. to about 40° C. to produce a warmed cheese; and
    (c) removing about 1% to about 90% of fat from the warmed cheese to generate a flavorful low-fat cheese.

11. The method of claim 10 wherein the shredded cheese comprises cheese granules of about 1 mm to about 10 mm in diameter.

12. The method of claim 10 wherein the shredded cheese comprises cheese granules of about 2 mm to about 6 mm in diameter.

13. The method of claim 10 wherein the shredded cheese is warmed to a temperature of about 20° C. to about 37° C.

14. The method of claim 10 wherein the fat is removed from the warmed cheese by centrifugation.

15. The method of claim 14 wherein the centrifugation provides a centrifugal force of about 1000×g to about 30,000×g.

16. The method of claim 14 wherein the centrifugation provides a centrifugal force of about 5000×g to about 25,000×g.

17. The method of claim 10 wherein the flavorful low-fat cheese is blended and pressed into a block before cooling.

18. The method of claim 10 wherein the low-fat cheese is flavorful in that its flavor is similar to the high fat cheese from which it was derived.

* * * * *

UNITED STATES PATENT AND TRADEMARK OFFICE
CERTIFICATE OF CORRECTION

PATENT NO. : 6,808,735 B2
DATED : October 26, 2004
INVENTOR(S) : Barbano et al.

It is certified that error appears in the above-identified patent and that said Letters Patent is hereby corrected as shown below:

Title page,
Item [75], Inventors, after "David Barbano, Dryden, NY (US)" please insert
-- , Christine Cholish Nicklas, San Pedro, CA (US) and Brandon Nelson, Ithaca, NY (US) --.

Signed and Sealed this

Eighth Day of November, 2005

JON W. DUDAS
*Director of the United States Patent and Trademark Office*